United States Patent
Shah et al.

(10) Patent No.: US 12,099,987 B2
(45) Date of Patent: Sep. 24, 2024

(54) HYBRID TOKENIZATION FOR PUSH PAYMENTS

(71) Applicant: Mastercard International Incorporated, Purchase, NY (US)

(72) Inventors: Nishith Shah, Ardsley, NY (US); Walter Pimenta, Miami, FL (US); Gerardo Cardone, Staten Island, NY (US); David Goldschmidt, Aventura, FL (US); Christopher Loh, New York, NY (US); Abhijit Malvi, San Mateo, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/134,264

(22) Filed: Apr. 13, 2023

(65) Prior Publication Data
US 2023/0245094 A1    Aug. 3, 2023

Related U.S. Application Data

(63) Continuation of application No. 16/887,105, filed on May 29, 2020, now Pat. No. 11,640,598.

(60) Provisional application No. 62/854,747, filed on May 30, 2019.

(51) Int. Cl.
*G06Q 20/32* (2012.01)
*G06Q 20/10* (2012.01)
*G06Q 20/38* (2012.01)
*G06Q 20/40* (2012.01)

(52) U.S. Cl.
CPC ......... *G06Q 20/3226* (2013.01); *G06Q 20/10* (2013.01); *G06Q 20/3821* (2013.01); *G06Q 20/401* (2013.01); *G06Q 2220/00* (2013.01)

(58) Field of Classification Search
None
See application file for complete search history.

(56) References Cited

U.S. PATENT DOCUMENTS

2006/0202025 A1 * 9/2006 Calabrese .............. G06Q 40/00 235/380
2014/0344153 A1 * 11/2014 Raj ...................... G06Q 20/385 705/44
2017/0300894 A1   10/2017 Shanmugam
(Continued)

OTHER PUBLICATIONS

892 Form dated Apr. 15, 2021 which was received in connection with U.S. Appl. No. 16/887,105.
(Continued)

*Primary Examiner* — Scott S Trotter
*Assistant Examiner* — Amit Patel
(74) *Attorney, Agent, or Firm* — Buckley, Maschoff & Talwalkar LLC

(57) ABSTRACT

A method of performing a funds transfer includes receiving a request for a cryptogram and generating an authentication code. The authentication code is divided into a first code portion and a second code portion. The first code portion is transmitted to a user device. The second code portion is transmitted to a transaction originator. A request for transaction data is received, including both code portions. The authentication code is verified based on the two code portions. A cryptogram is generated and transmitted to the transaction originator.

18 Claims, 8 Drawing Sheets

(56) References Cited

U.S. PATENT DOCUMENTS

2020/0380113 A1 12/2020 Bock et al.
2020/0382486 A1 12/2020 Dunjic et al.
2021/0105589 A1 4/2021 Kassemi et al.

OTHER PUBLICATIONS

892 Form dated Feb. 16, 2021 which was received in connection with U.S. Appl. No. 16/887,105.
892 Form dated May 23, 2022 which was received in connection with U.S. Appl. No. 16/887,105.
892 Form dated Oct. 27, 2021 which was received in connection with U.S. Appl. No. 16/887,105.
Notice of Allowance which was received in connection with U.S. Appl. No. 16/887,105.

* cited by examiner

HYBRID TOKENIZATION FOR PUSH PAYMENTS

CROSS REFERENCES TO RELATED APPLICATIONS

This application claims the benefit of U.S. patent application Ser. No. 16/887,105 (filed on May 29, 2020), which claims benefit U.S. Provisional Patent Application Ser. No. 62/854,747 (filed on May 30, 2019); the contents of both applications being hereby incorporated by reference for all purposes.

BACKGROUND

Funds transfer services are commercially available in which the "backbone" of the funds transfer network also serves as the underlying network for a payment card account system. It would be desirable for security purposes to shield sensitive information such as users' payment account numbers from exposure during use of such funds transfer networks.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and example embodiments and which are not necessarily drawn to scale, wherein.

DESCRIPTION

In general, and for the purpose of introducing concepts of embodiments of the present disclosure, a token that represents a user's funding payment account is held in a server computer operated by a transaction originator. The token is accessible by the user's device (e.g., a mobile device) for the purpose of initiating a funds transfer transaction. In the initial stages of a funds transfer transaction, the user's (sender's) device is bound to the token. The device binding process includes sending a first part of an authentication code from a digitization service to the device, via a push notification service. The second part of the authentication code is sent separately to the transaction originator (i.e., the server that stores the token). The transaction originator is required to submit both parts of the authentication code to the digitization service when requesting a cryptogram to initiate the funding leg of the funds transfer transaction.

With tokenization of payment credentials held by the transaction originator, and strong binding of the sender's device to the sender's token during a transaction, an advantageous level of security is achieved for funds transfer transactions and storage of credentials that enable such transactions.

Figure 1:
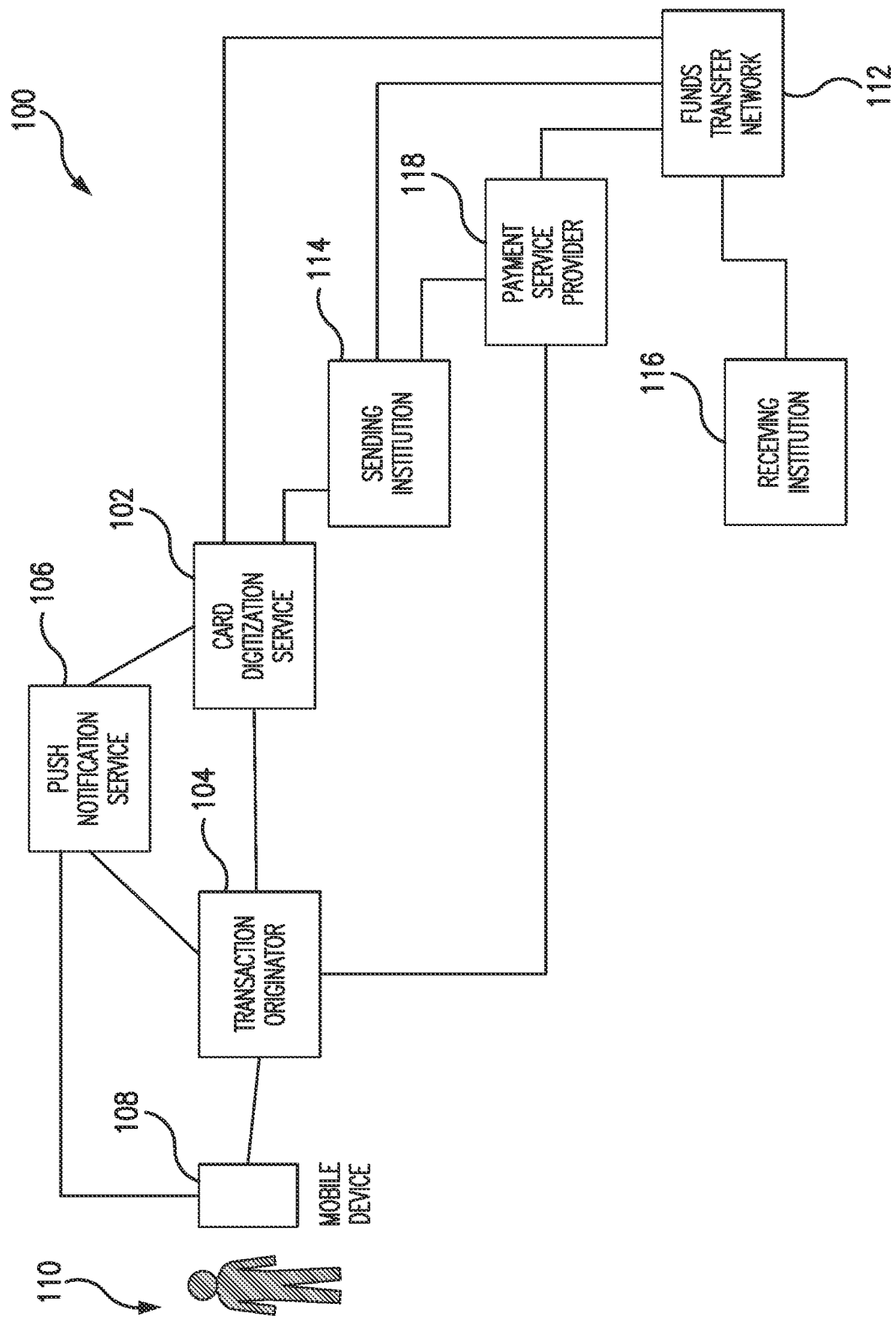
FIG. 1 is a block diagram of a funds transfer system according to aspects of the present disclosure.

FIG. 1 is a block diagram of a funds transfer system 100 according to aspects of the present disclosure.

The funds transfer system 100 includes a digitization service 102 (also referred to as a "card digitization service") that plays a key role in digitization and tokenization of payment accounts and that also is central in handling of funds transfer transactions. The funds transfer system 100 also includes a transaction originator 104, which is in communication, at least from time to time, with the digitization service 102. The transaction originator 104, which may also be thought of as a token requestor, stores a token that represents a user's payment account. In some embodiments, the transaction originator 104 may also perform other roles. For example, the transaction originator 104 may be a social media platform.

The funds transfer system 100 further includes a push notification service 106. In some embodiments, the push notification service 106 may be closely associated with or part of the digitization service 102. If not part of the digitization service 102, the push notification service 106 may be in communication, at least from time to time, with the card digitization service 102 and the transaction originator 104.

The funds transfer system 100 may also be considered to include a mobile device 108 operated by a user 110. The mobile device 108 may be in communication from time to time with the transaction originator 104 and the push notification service 106. The mobile device 108 may be conventional except that it may run an application program ("app") supplied by the transaction originator 104 to allow the user to operate the mobile device 108 to initiate and carry out funds transfer transactions as described herein.

Still further, the funds transfer system 100 includes a funds transfer network 112. The funds transfer network 112 may be based on a payment account system network (not separately shown), such as that operated by Mastercard International Incorporated, which is the assignee hereof. The funds transfer network 112 may include a "front end" (not separately shown) that provides interfaces as required to allow the payment account system network to be accessed for funds transfer transactions. The funds transfer network 112 may be in communication, at least from time to time, with the digitization service 102.

In addition, the funds transfer system 100 may include a sending financial institution (FI) 114. The sending FI 114 may be the issuer of the payment account to be used by the user 110 to fund the funds transfer. The sending FI 114 may be in communication, at least from time to time, with the funds transfer network 112 and the digitization service 102.

Moreover, the funds transfer system 100 may include a receiving FI 116. The receiving FI 116 may be the issuer of the account (recipient's account) to which the funds transfer is to be credited. The receiving FI 116 may be in communication, at least from time to time, with the funds transfer network 112.

Still further, the funds transfer system 100 may include a payment service provider 118. The payment service provider 118 may facilitate funds transfer transactions and may serve as a point of access to the funds transfer network 112. The payment service provider may be in communication, at least from time to time, with the sending FI 114, the transaction originator 104 and the funds transfer network 112.

Each block in FIG. 1 that represents an entity should also be understood to represent one or more computers operated by or on behalf of that entity.

The payment system 100 is illustrated in FIG. 1 in the context of a single transaction. However, in a practical embodiment of the payment system 100, it may handle numerous transactions, including numerous simultaneous transactions. The system 100 may include additional entities/computing resources that also perform at least some of the roles performed by the entities shown explicitly in FIG. 1.

An example of operation of the payment system 100 will be described below, particularly with reference to FIG. 3. First, though, there will be a further description of some components of the payment system 100.

Figure 2:
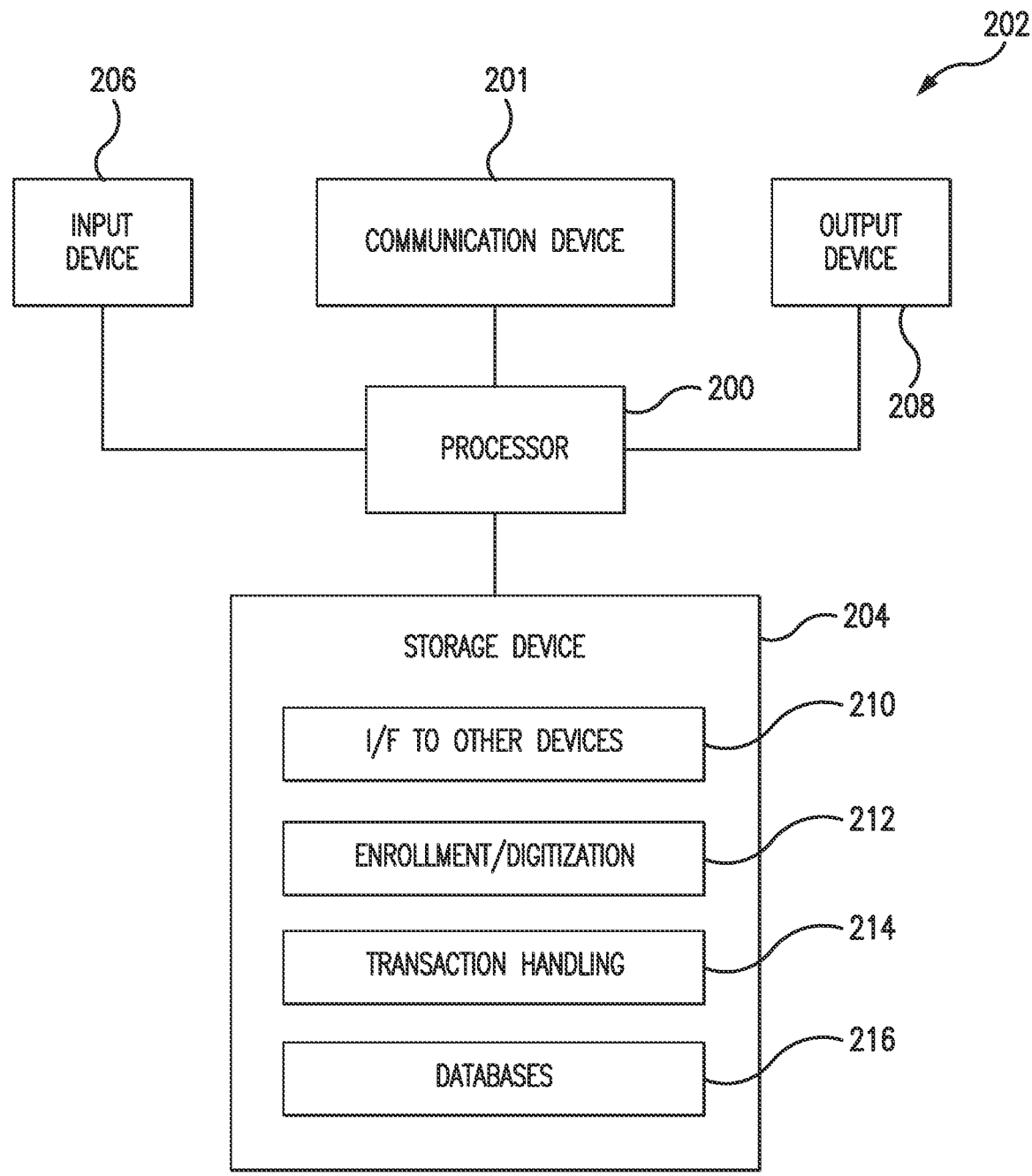
FIG. 2 is a block diagram of a computer system that may play a role in the funds transfer system of FIG. 1.

FIG. 2 is a block diagram that illustrates an example embodiment of a computer system 202 that may implement at least some functions of the digitization service 102 shown in FIG. 1. The computer 202 will therefore be referred to as the "digitization service computer." The digitization service computer 202 may, in its hardware aspects, resemble a typical mainframe or server computer, but may be controlled by software to cause it to function as described herein.

Referring to FIG. 2, the digitization service computer 202 may include a computer processor 200 operatively coupled to a communication device 201, a storage device 204, an input device 206 and an output device 208. The communications device 201, the storage device 204, the input device 206 and the output device 208 may all be in communication with the processor 200.

The computer processor 200 may be constituted by one or more processors. Processor 200 operates to execute processor-executable steps, contained in program instructions described below, so as to control the digitization service computer 202 to provide desired functionality.

Communication device 201 may be used to facilitate communication with, for example, other devices such as other components of the funds transfer system 100. Communication device 201 may comprise numerous communication ports (not separately shown), to allow the digitization service computer 202 to communicate simultaneously with a considerable number of other computers, and/or to simultaneously handle numerous transactions.

Input device 206 may comprise one or more of any type of peripheral device typically used to input data into a computer. For example, the input device 206 may include a keyboard and a mouse. Output device 208 may comprise, for example, a display and/or a printer.

Storage device 204 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 204 stores one or more programs for controlling processor 200. The programs comprise program instructions (which may be referred to as computer readable program code means) that contain processor-executable process steps of the digitization service computer 202, executed by the processor 200 to cause the digitization service computer 202 to function as described herein.

The programs may include one or more conventional operating systems (not shown) that control the processor 200 so as to manage and coordinate activities and sharing of resources in the digitization service computer 202, and to serve as a host for application programs (described below) that run on the digitization service computer 202.

The storage device 204 may also store interface software program(s) 210. The interface software program(s) 210 may provide software interfaces to facilitate interaction between the digitization service computer 202 and other components of the funds transfer system 100.

The storage device 204 may in addition store an application program 212 for handling requests for user enrollment and card account digitization. Also, the storage device 204 may store an application program 214 for handling funds transfer transactions. Aspects of these programs, and the manners in which the digitization service computer 202 operates under control of these programs, will be discussed below.

The storage device 204 may also store, and digitization service computer 202 may also execute, other programs, which are not shown. For example, such programs may include communications software and a reporting application. The latter program may respond to requests from system administrators for reports on the activities performed by the digitization service computer 202. The other programs may also include, e.g., device drivers, database management software, etc.

Moreover, the storage device 204 may also store one or more databases 216 needed for operation of the digitization service computer 202.

Figure 2A:
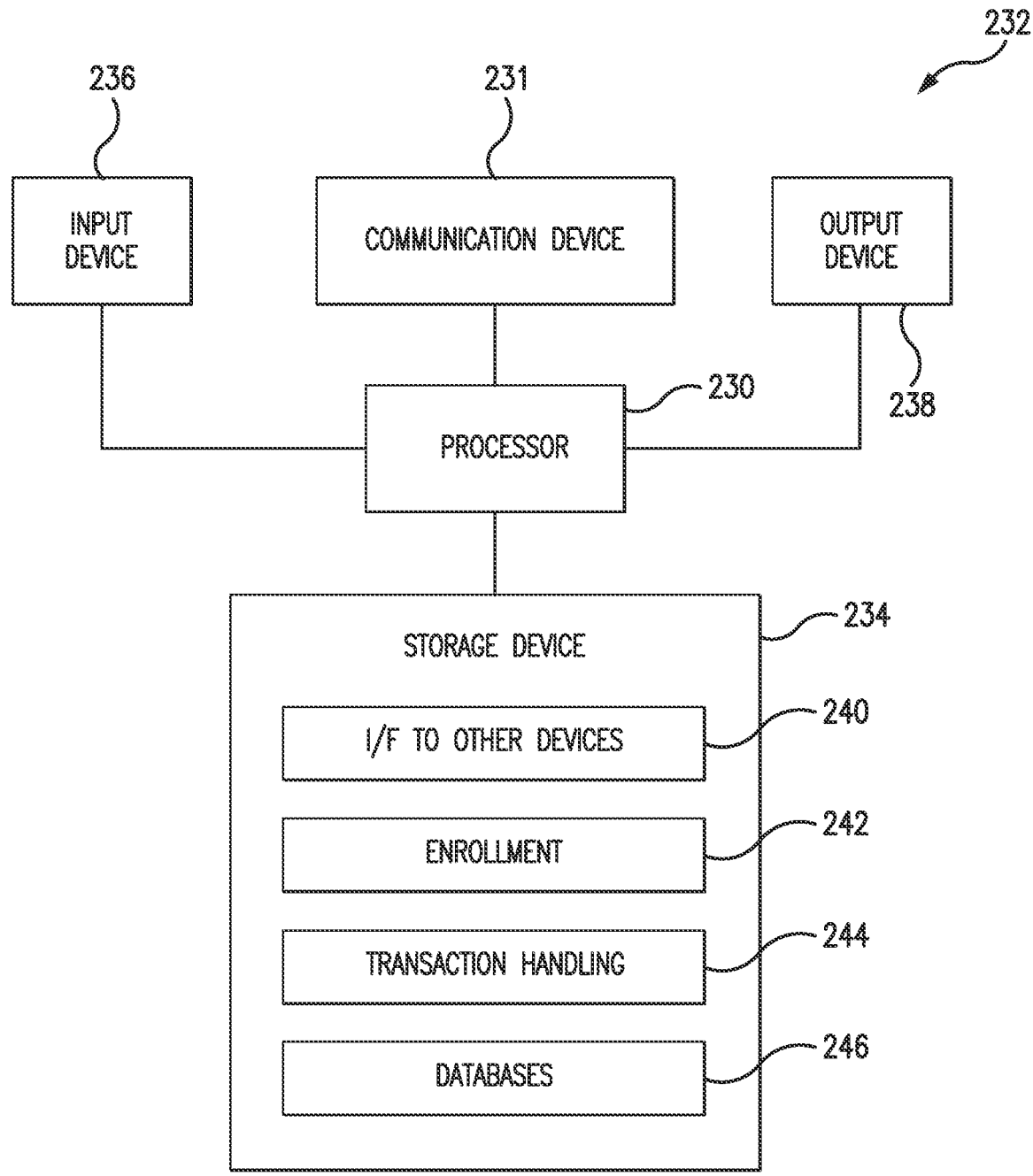
FIG. 2A is a block diagram of another computer system that may play a role in the funds transfer system of FIG. 1.

Other computer components of the payment system 100 of FIG. 1 may have a similar architecture and/or similar components as were described in connection with FIG. 2. FIG. 2A is a block diagram that illustrates an example embodiment of a computer system 232 that may implement at least some functions of the transaction originator 104 shown in FIG. 1. The computer 232 will therefore be referred to as the "transaction originator computer." The transaction originator computer 232 may, in its hardware aspects and in its architecture, resemble the digitization service computer 202 described above, but may be programmed differently from the digitization service computer 202 so as to perform functions ascribed herein to the transaction originator 104.

Referring to FIG. 2A, the transaction originator computer 232 may include a computer processor 230 operatively coupled to a communication device 231, a storage device 234, an input device 236 and an output device 238. The communications device 231, the storage device 234, the input device 236 and the output device 238 may all be in communication with the processor 230.

Storage device 234 stores one or more programs for controlling processor 230. The programs comprise program instructions (which may be referred to as computer readable program code means) that contain processor-executable process steps of the transaction originator computer 232, executed by the processor 230 to cause the transaction originator computer 232 to function as described herein.

The programs may include one or more conventional operating systems (not shown) that control the processor 230 so as to manage and coordinate activities and sharing of resources in the transaction originator computer 232, and to serve as a host for application programs (described below) that run on the transaction originator computer 232.

The storage device 234 may also store interface software program(s) 240. The interface software program(s) 240 may provide software interfaces to facilitate interaction between the transaction originator computer 232 and other components of the funds transfer system 100.

The storage device 234 may in addition store an application program 242 for handling requests for user enrollment and card account digitization. Also, the storage device 234 may store an application program 244 for handling funds transfer transactions. Aspects of these programs, and the manners in which the transaction originator computer 232 operates under control of these programs, will be discussed below.

The storage device 234 may also store, and transaction originator computer 232 may also execute, other programs, which are not shown. For example, such programs may include communications software and a reporting application. The latter program may respond to requests from system administrators for reports on the activities performed by the transaction originator computer 232. The other programs may also include, e.g., device drivers, database management software, etc.

Moreover, the storage device 234 may also store one or more databases 246 needed for operation of the transaction originator computer 232.

Figure 2B:
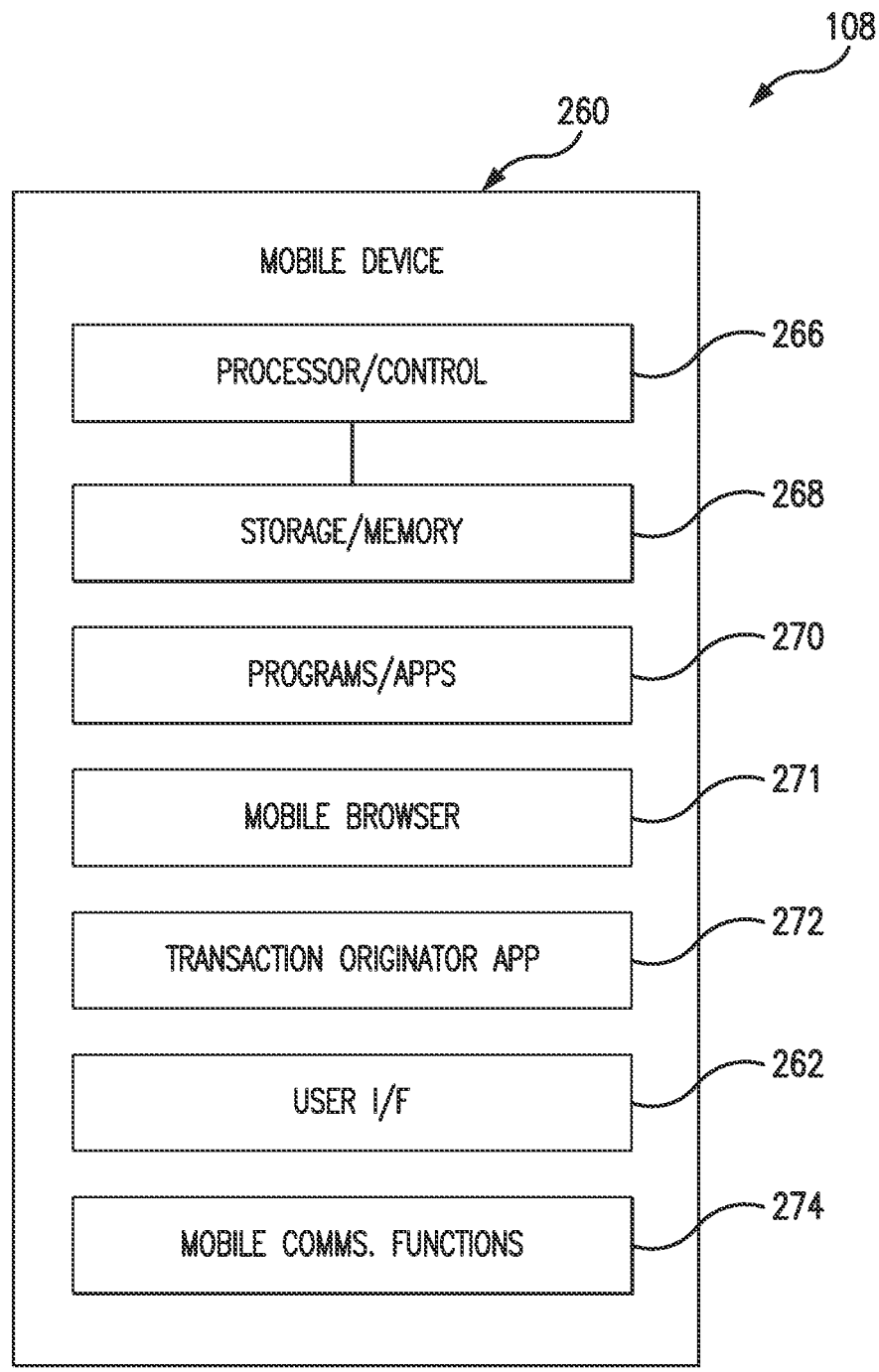
FIG. 2B is a simplified block diagram of a mobile device that may be operated by a user of the funds transfer system of FIG. 1.

FIG. 2B is a simplified block diagram of an example of the mobile device 108 shown in FIG. 1. In this example embodiment, the mobile device 108 is illustrated as a smartphone.

The mobile device 108 may include a housing 260, which may be shaped and sized to be held in a user's hand. The front of the housing 260 may predominantly be constituted by a touchscreen (not separately shown), which is a key component of the user interface 262 of the mobile device 108. The mobile device 108 further includes a processor/control circuit 266, which is contained within the housing 260. Also included in the mobile device 108 is a storage/memory device or devices (reference numeral 268). The storage/memory devices 268 are in communication with the processor/control circuit 266 and may contain program instructions to control the processor/control circuit 266 to manage and perform various functions of the mobile device 108. Programs/applications (or "apps") that are stored in the storage/memory devices 268 are represented at block 270 in FIG. 2B and may be accessed to program the processor/control circuit 266. In view of its pertinence to the teachings of this disclosure, a browser program is shown separately from the programs/apps 270 and is represented by block 271. In the same vein, a transaction originator app 272 is depicted separately from the other programs/apps 270

As is typical for smartphones, the mobile device 108 may include mobile communications components and software as represented by block 274. The mobile communications components 274 allow the mobile device 108 to engage in data communication with other devices, and voice communication with other smartphones via a mobile communications network (not shown).

From the foregoing discussion, it will be appreciated that the blocks depicted in FIG. 2B as components of the mobile device 108 may in effect overlap with each other, and/or there may be functional connections among the blocks that are not explicitly shown in the drawing. While the above description has been premised on the mobile device 108 being embodied as a smartphone, the disclosure herein should not be so limited, as the mobile device 108 may be embodied by a tablet computer or other type of mobile device different from a smartphone.

Figure 3:
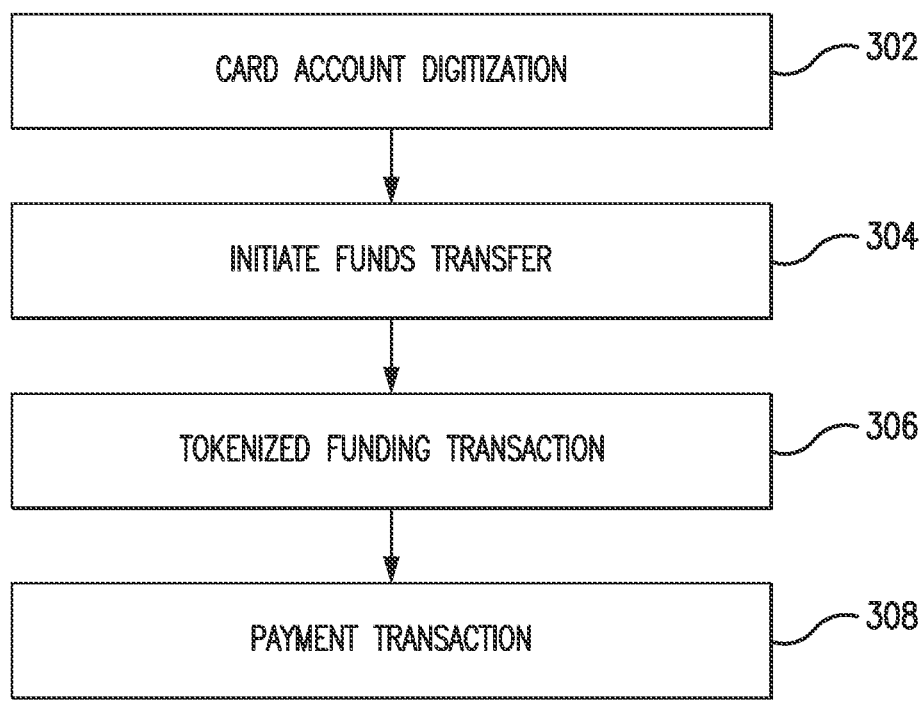
FIG. 3 is a flow chart that illustrates a process that may be performed in the system of FIG. 1 in accordance with aspects of the present disclosure.

FIG. 3 is a flow chart that illustrates an example of a process that may be performed in the payment system 100 of FIG. 1, according to aspects of the present disclosure.

Figure 4:
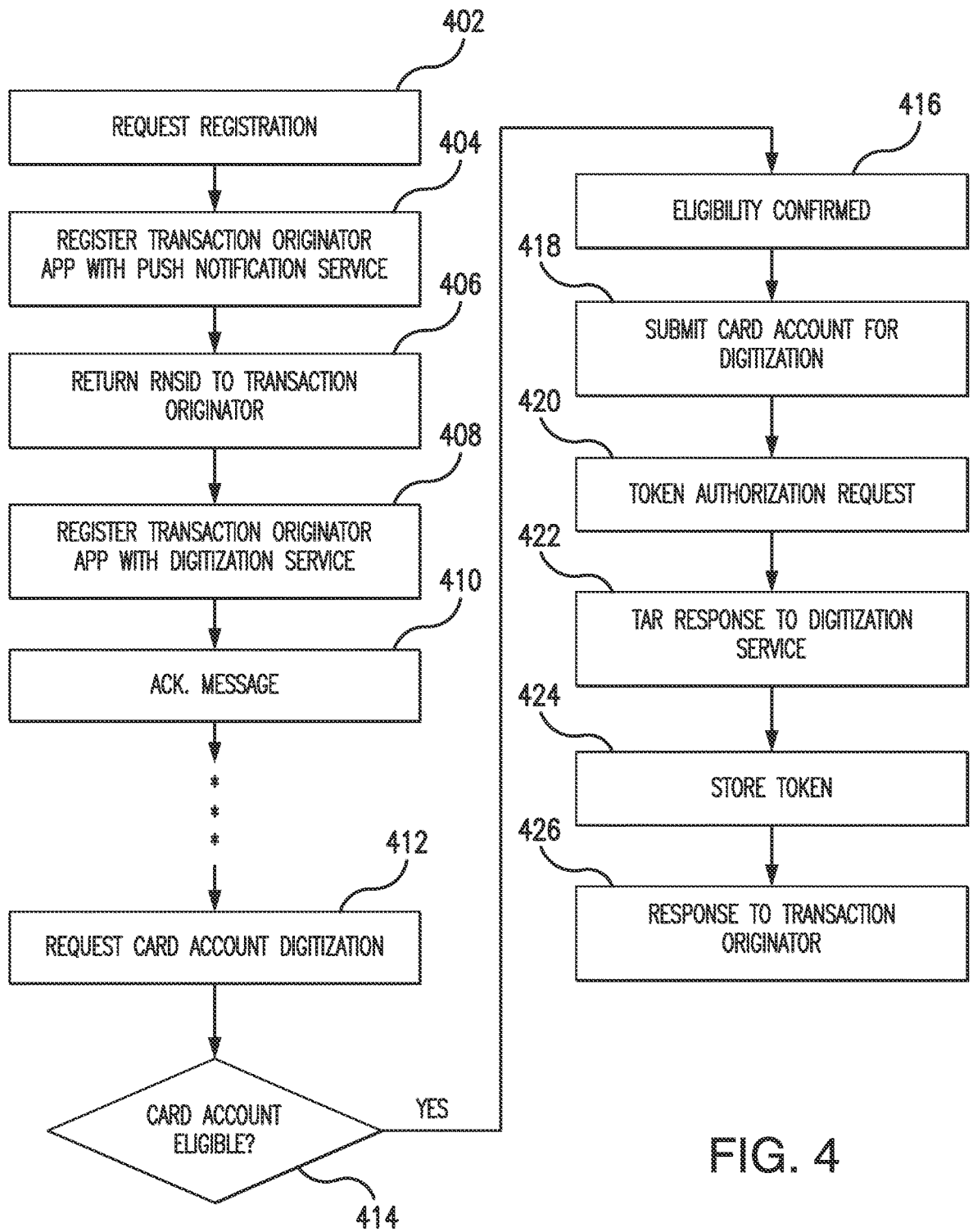
FIGS. 4, 5 and 6 are additional flow charts that illustrate details of the process of FIG. 3.

At 302 in FIG. 3, a card account digitization operation occurs. The card account digitization operation may include, or may follow, an enrollment/registration process. FIG. 4 is a flow chart that illustrates details of the processing of step 302. Referring to FIG. 4, at 402, in the registration process, the user 110 may operate the mobile device 108 to request registration via the transaction originator 104. At 404 in FIG. 4, the transaction originator 104 may communicate with the push notification service 106 to register the user 110, or more specifically to register an instance of the token originator app that has been loaded into the mobile device 108. At 406 in FIG. 4, the push notification service 106 may return to the transaction originator 104 a remote notification service ID (RNSID). At 408, the transaction originator 104 may then register the token originator app instance on the mobile device 108 with the digitization service 102 by transmitting the RNSID to the digitization service 102. The digitization service 102 may return an acknowledgment message (410 in FIG. 4) to the transaction originator 104.

Thereafter, perhaps with some lapse of time, the user 110 may operate the mobile device 108 to add a card account for digitization/tokenization into the custody of the transaction originator 104 (i.e., the user 110 may request digitization of the card account, as indicated at 412 in FIG. 4). The transaction originator 104 may send a request to the digitization service 102 to determine whether the requested card account for digitization is eligible for digitization. The digitization service 102 may check the eligibility of the card account for digitization, and (per decision block 414 in FIG. 4) may then send a response accordingly to the transaction originator 104. Assuming the card account was found to be eligible (block 416) for digitization, then at 418 in FIG. 4, the transaction originator 104 may submit the card account to the digitization service 102 for digitization. At 420, the digitization service 102 may then submit a token authorization request (TAR) to the sending FI 114. At 422, the sending FI 114 may respond to the TAR with a message to the digitization service 102 to indicate that the TAR is approved or declined or that additional authentication is required. Assuming the TAR is approved, the token or tokens will be stored (block 424) in a server computer (not separately shown) that is operated by the transaction originator 104. At block 426, the digitization service 102 may pass on to the transaction originator 104 a response message mirroring the response from the sending FI 114—i.e., approved, declined or additional authentication required, as the case may be.

The sending FI 114 may be permitted to choose its preferred path for authenticating the user during the card digitization operation. Possible paths the sending FI 114 may select may include (a) having the user 110 call the sending FI customer care call center (not shown); (b) issuance of and verification of a one time password (OTP), with, for example, the digitization service 102 generating and validating the OTP but with the OTP having been sent to the user's mobile device 108 by the sending FI 114; and/or (3) authentication via a banking application previously provisioned by the sending FI 114 to the user's mobile device 108. Other authentication paths are also contemplated.

Perhaps with another lapse of time, a funds transfer transaction may be initiated, as indicated at 304 in FIG. 3. This may occur, for example, by the user 110 operating the mobile device 108 to send a suitable message to the transaction originator 104. The message may specify the recipient and the amount of the funds transfer. In some embodiments, for example where the transaction originator is a social media platform, the user/sender and the recipient may both be users of the social media platform and may both have card accounts digitized/tokenized for custody by the transaction originator 104.

Figure 5:
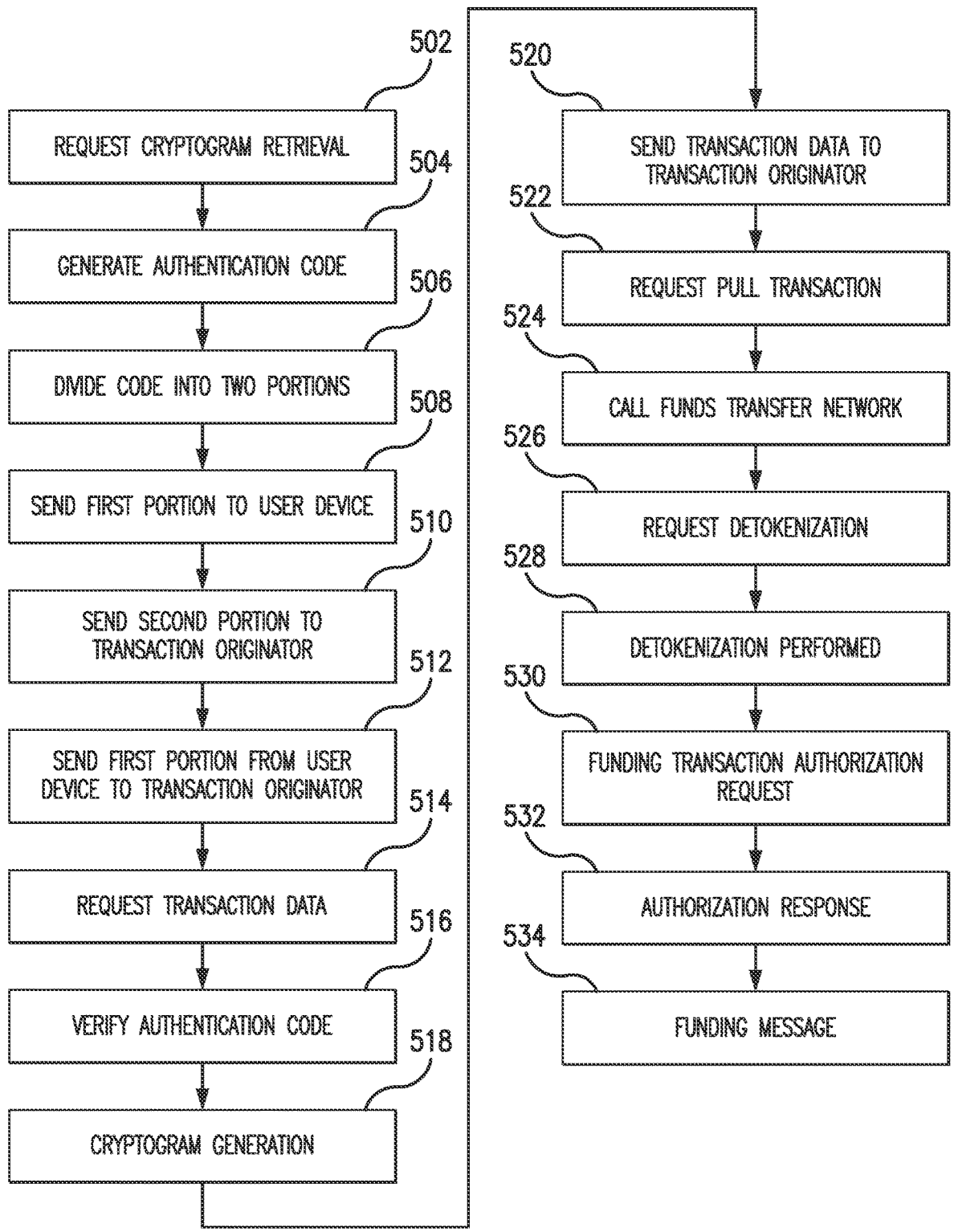

In response to the message from the user 110, a funding transaction for the funds transfer may be performed. The tokenized funding transaction is represented at block 306 of FIG. 3. FIG. 5 is a flow chart that illustrates details of the processing of block 306.

Referring to FIG. 5, at 502, in an initial phase of the funding transaction, the transaction originator 104 may send a message to the digitization service 102 to initiate retrieval of a DSRP (digital secure remote payments) cryptogram for each of the sender (user 110) and the recipient. The digitization service 102 then proceeds with a process to bind the token presented by the transaction originator 104 to the registered device 108 for the user/sender 110. Initially, at 504, the digitization service 102 generates a strong time-bound authentication code and divides (block 506) the authentication code into two parts. At 508 in FIG. 5, one part of the authentication code (call it "part one") is transmitted from the digitization service 102 to the push notification service 106 with instructions for the push notification service 106 to push part one of the authentication code to the user's mobile device 108. The push notification service 106 then pushes part one of the authentication code to the user's mobile device 108.

As to the other part of the authentication code (call it "part two"), at 510 in FIG. 5, the digitization service 102 transmits it to the transaction originator 104. This completes delivery of the authentication code.

Validation of the authentication code then occurs. At 512 in FIG. 5, the user's mobile device 108 transmits part one of the authentication code to the transaction originator 104. At 514, the transaction originator 104 then sends a "get transaction data" message to the digitization service 102. The "get transaction data" message includes both part one and part two of the authentication code that was previously delivered in separate parts to the mobile device 108 and the transaction originator 104. At 516 in FIG. 5, the digitization service 102 then verifies the authentication code as contained in the "get transaction data" message. Upon successful verification, the digitization service 102 generates (block 518) a suitable cryptogram for the sender and possibly another cryptogram for the recipient. At 520 in FIG. 5, the digitization service 102 then transmits a "transaction data" message to the transaction originator 104; that message includes the cryptogram(s).

At 522 in FIG. 5, with the cryptogram(s) on hand, the transaction originator 104 sends an essentially conventional message to the payment service provider 118 to call for execution of the funding ("pull") transaction for the funds transfer. The payment service provider 118, in some embodiments, may perform due diligence processing with respect to the sender and recipient. If all is in order, the funds transfer may proceed. At 524 in FIG. 5, the payment service provider 118 sends a corresponding call message to the front end (not separately shown) of the funds transfer network 112. The funds transfer network front end then processes the information received in the call message received from the payment service provider 118. At 526 in FIG. 5, the funds transfer network front end then sends a network message to the digitization service 102, to request detokenization of the sender's tokenized payment credentials. At 528, the digitization service 102 responds to this message by detokenizing the submitted credentials and transmitting detokenized credentials to the funds transfer network front end. At 530, the funds transfer network front end then submits a payment account system transaction authorization request message to the sending FI 114. The sending FI 114 performs suitable processing of the transaction authorization request message, and transmits a transaction authorization response message (block 532) to the funds transfer network front end. (It is assumed that the transaction authorization response message indicates approval of the requested funding transaction.) The funds transfer network front end then transmits a funding response message (534) to the payment service provider 118, to indicate that funding for the funds transfer has occurred.

Figure 6:
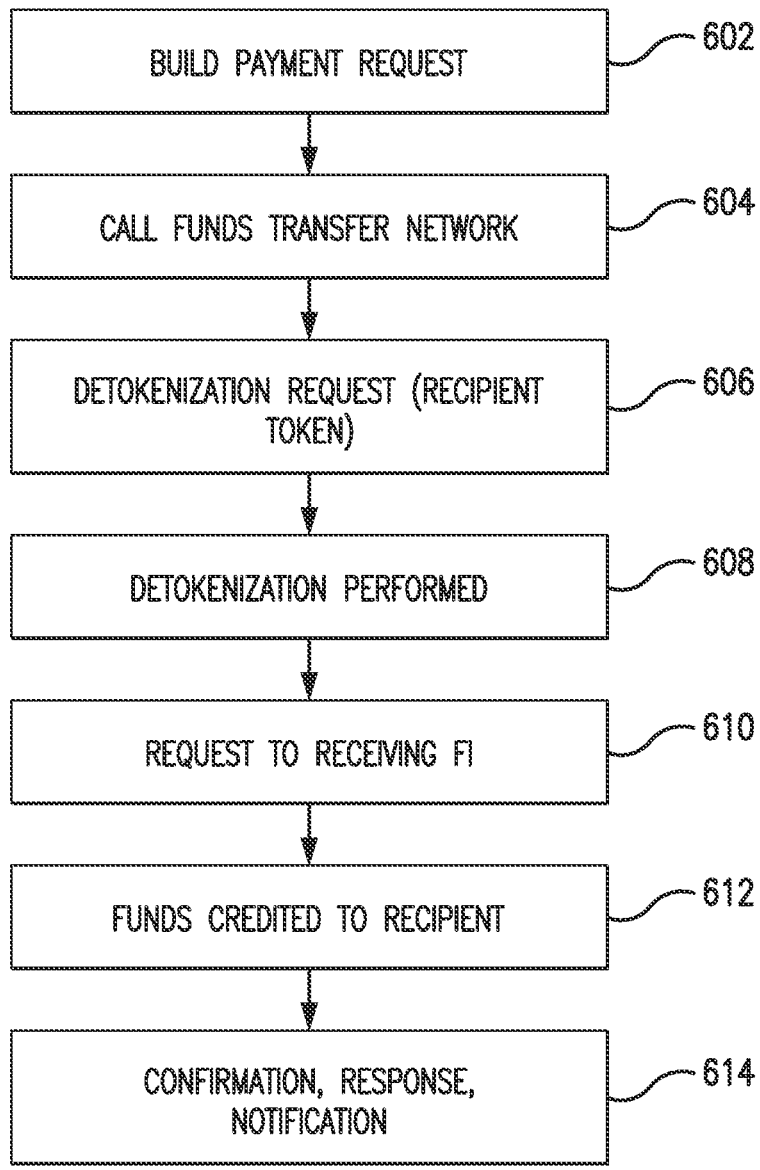

This completes the funding leg of the funds transfer. The corresponding payment transaction now begins. The payment transaction is represented at 308 in FIG. 3. FIG. 6 is a flow chart that illustrates details of the processing of step 308.

Referring to FIG. 6 at 602, in an initial phase of the payment transaction, the payment service provider 118 may build a payment request. Then, at 604 in FIG. 6, the payment service provider may send a payment call message to the funds transfer network front end. The funds transfer network front end may identify the appropriate routing network and may route a call message to the funds transfer network 112. It will now be assumed that the recipient's payment credentials were tokenized (and perhaps also stored in the transaction originator server (not separately shown)). At 606 in FIG. 6, the funds transfer network 112 then sends a message to the digitization service 102 to request detokenization of the recipient's account credentials. At 608, the digitization service 102 responds to this message by detokenizing the submitted credentials and transmitting the detokenized credentials to the funds transfer network 112. At 610, the funds transfer network 112 then sends a conventional request to the receiving FI 116 to receive the payment associated with the funds transfer. At 612, the receiving FI 116 then credits the funds to the recipient's account maintained at the receiving FI 116. The receiving FI 116 may also notify the recipient (not shown) concerning the received funds transfer. Further, the receiving FI sends a response message to the funds transfer network 112, which in turn may send an acknowledgement to the funds transfer network front end. The funds transfer network front end may send an acknowledgement message to the payment service provider 118 to confirm that the funds transfer has been completed. The payment service provider 118 may send a corresponding message to the transaction originator 104 to confirm that the funds transfer has occurred. The transaction originator 104 may notify the sender (user 110) that the funds transfer has been accomplished. (The above-recited notifications, responses and confirmations are represented by block 614 in FIG. 6.)

With the funds transfer process as described herein, the actual account information for the sender and the recipient is shielded by use of tokens except within the funds transfer network and the sending and receiving FIs. This results in enhanced security in the funds transfer system regarding sensitive account information. Moreover, the funding account token is tightly bound to the sender's mobile device 108 via a split authentication code process to protect the sender from exploitation of any interception or improper appropriation of the sending account token. Again, security of the funds transfer system is enhanced in this way.

As used herein, the term "computer" should be understood to encompass a single computer or two or more computers in communication with each other.

As used herein, the term "processor" should be understood to encompass a single processor or two or more processors in communication with each other.

As used herein, the term "memory" should be understood to encompass a single memory or storage device or two or more memories or storage devices.

As used herein, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps and/or omission of steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account, or a number carried by a payment card, or a number that is used to route a transaction in a payment system that handles payment card transactions. The term "payment card" includes a credit card, debit card, prepaid card, or other type of payment instrument, whether an actual physical card, electronic, or virtual.

As used herein, the term "payment card system" or "payment account system" or "payment card account system" refers to a system for handling purchase transactions and related transactions. An example of such a system is the one operated by Mastercard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific example embodiments, it should be understood that various changes, substitutions, and alterations apparent to those skilled in the art can be made to the disclosed embodiments without departing from the spirit and scope of the appended claims.

What is claimed is:

1. A method comprising:
receiving, by a transaction originator, a request, from a user of a mobile device, to enroll the user in a digitization service;
communicating with a push notification service, by the transaction originator, to register the user with the digitization service;
receiving, by the transaction originator, a remote notification service identifier (RSNID) from a push notification service;
registering, by the transaction originator, a token originator application on the mobile device of the user with the digitization service;
receiving a request, by the transaction originator, from the mobile device for digitization of a card account of the user;
transmitting the card account, from the transaction originator, to the digitization service in response to receiving a first message from the digitization service indicating that the card account of the user is eligible for digitization;
receiving a second message, by the transaction originator and transmitted from the digitization service, the second message indicating whether a sending financial institution has approved the request for digitization of the card account of the user and has authenticated the user;
receiving, by the transaction originator, a first code portion of an authentication code from a user device of the user;
receiving, by the transaction originator, a second code portion of the authentication code from digitization service;
transmitting, by the transaction originator, the first code portion and the second code portion of the authentication code to the digitization service to validate the authentication code; and
receiving, by the transaction originator, a cryptogram from the digitization service in response to validation of the authentication code, the cryptogram being usable for payment of a funds transfer from an account of the user for a transaction.

2. The method of claim 1, further comprising transmitting a request, by the transaction originator, to the digitization service to determine whether the card account is eligible for digitization.

3. The method of claim 2, further comprising receiving a response, by the transaction originator, from the digitization service indicating whether the card account is eligible for digitization.

4. The method of claim 1, wherein the registering of the token originator application comprises transmitting, by the transaction originator, the RSNID to the digitization service.

5. The method of claim 2, further comprising processing, by the transaction originator, an acknowledgement message received from the card account digitization service responsive to the transaction originator transmitting the RNSID to the digitization service.

6. The method of claim 1, further comprising sending, by the digitization service, a token authorization request to the sending financial institution.

7. The method of claim 6, further comprising receiving, by the digitization service, a message from the sending financial institution indicating at least one of: whether the token authorization request has been approved, denied, or whether additional authentication is required.

8. A transaction originator comprising:
a communication device to transmit and receive signals;
a processor to process one or more signals received from the communication device and initiation transmission of one or more signals via the communication device, the processor to perform a method comprising:
processing a request, received from a user of a mobile device, to enroll the user in a digitization service;
initiating communication with a push notification service to register the user with the digitization service;
processing a remote notification service identifier (RSNID) received from a push notification service;
registering a token originator application on the mobile device of the user with the digitization service;
processing a request received from the mobile device for digitization of a card account of the user;
initiating transmission of the card account to the digitization service in response to receiving a first message from the digitization service indicating that the card account of the user is eligible for digitization; and processing a second message received from the digitization service, the second message indicating whether a sending financial institution has approved the request for digitization of the card account of the user and has authenticated the user;

processing a first code portion of an authentication code received from a user device of the user;

processing a second code portion of the authentication code received from digitization service;

transmit the first code portion and the second code portion of the authentication code to the digitization service to validate the authentication code; and processing a cryptogram received from the digitization service in response to validation of the authentication code, the cryptogram being usable for payment of a funds transfer from an account of the user for a transaction.

9. The transaction originator of claim 8, wherein the method performed by the processor further comprises initiating transmission of a request to the digitization service to determine whether the card account is eligible for digitization.

10. The transaction originator of claim 9, wherein the method performed by the processor further comprises processing a response received from the digitization service indicating whether the card account is eligible for digitization.

11. The transaction originator of claim 8, wherein the transaction originator comprises a server.

12. The transaction originator of claim 8, wherein the method performed by the processor further comprises initiating transmission of a token authorization request to the sending financial institution.

13. The transaction originator of claim 8, wherein the method performed by the processor further comprises processing a message from the sending financial institution indicating at least one of: whether the token authorization request has been approved, denied, or whether additional authentication is required.

14. An article, comprising:
a non-transitory storage medium comprising computer-readable instructions executable by a processor to:
process a request, received from a user of a mobile device, to enroll the user in a digitization service;
initiate communication with a push notification service to register the user with the digitization service;
process a remote notification service identifier (RSNID) received from a push notification service;
register a token originator application on the mobile device of the user with the digitization service;
process a request received from the mobile device for digitization of a card account of the user;
initiate transmission of the card account to the digitization service in response to receiving a first message from the digitization service indicating that the card account of the user is eligible for digitization; and
process a second message received from the digitization service, the second message indicating whether a sending financial institution has approved the request for digitization of the card account of the user and has authenticated the user;
process a first code portion of an authentication code received from a user device of the user;
process a second code portion of the authentication code received from digitization service;
transmit the first code portion and the second code portion of the authentication code to the digitization service to validate the authentication code; and
process a cryptogram received from the digitization service in response to validation of the authentication code, the cryptogram being usable for payment of a funds transfer from an account of the user for a transaction.

15. The article of claim 14, wherein the computer-readable instructions executable by the processor to initiate transmission of a request to the digitization service to determine whether the card account is eligible for digitization.

16. The article of claim 15, wherein the computer-readable instructions executable by the processor to process a response received from the digitization service indicating whether the card account is eligible for digitization.

17. The article of claim 14, wherein the computer-readable instructions executable by the processor to initiate transmission of a token authorization request to the sending financial institution.

18. The article of claim 17, wherein the computer-readable instructions executable by the processor to process a message from the sending financial institution indicating at least one of: whether the token authorization request has been approved, denied, or whether additional authentication is required.

* * * * *